(12) United States Patent
Suzuki et al.

(10) Patent No.: US 6,595,895 B2
(45) Date of Patent: Jul. 22, 2003

(54) CONTROL APPARATUS OF HYBRID VEHICLE

(75) Inventors: Takehiko Suzuki, Anjo (JP); Satoru Wakuta, Anjo (JP); Kazuo Takemoto, Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 10/012,361

(22) Filed: Dec. 12, 2001

(65) Prior Publication Data

US 2002/0123409 A1 Sep. 5, 2002

(30) Foreign Application Priority Data

Dec. 28, 2000 (JP) ........................................ 2000-402888

(51) Int. Cl.[7] ................................................. B60K 1/02
(52) U.S. Cl. ................................. 477/3; 477/20; 475/5; 180/65.3
(58) Field of Search ............................ 477/3, 20; 475/2, 475/5; 180/65.3, 65.7; 701/22

(56) References Cited

U.S. PATENT DOCUMENTS 5,935,040 A * 8/1999 Tabata et al. .............. 180/65.2
5,944,630 A * 8/1999 Omote ............................ 477/5
6,359,404 B1 * 3/2002 Sugiyama et al. ......... 180/65.2
2002/0065589 A1 * 5/2002 Ostberg et al.

FOREIGN PATENT DOCUMENTS

JP          11069508     *  8/1997   ........... B60L/11/14

* cited by examiner

*Primary Examiner*—Sherry Estremsky
*Assistant Examiner*—Tisha D. Lewis
(74) *Attorney, Agent, or Firm*—Lorusso, Loud & Kelly (57) ABSTRACT

If a torque reduction request is outputted during a speed shift, the amount of motor torque reduction achieved by a motor-generator, of a requested amount of torque reduction, is set to a greatest-possible amount, and the amount of engine torque reduction achieved by an engine is set to a smallest-possible amount. The amount of motor torque reduction is set based on the amount of charges stored (SOC) in a battery device. If $SOC \leq SOC1$, the amount of motor torque reduction is set to a maximum value regardless of the value of SOC. If $SOC1 < SOC \leq SOC2$, the amount of motor torque reduction is set in accordance with SOC. If $SOC2 < SOC$, the amount of motor torque reduction is set to zero. Thus, the amount of motor torque reduction is set to a greatest-possible value in accordance with the amount of charges stored (SOC).

7 Claims, 5 Drawing Sheets

|      | C1 | C2 | C3 | B1 | B2 | B3 | B4 | B5 | F1 | F2 |
|------|----|----|----|----|----|----|----|----|----|----|
| N    |    |    |    |    |    |    |    | ○  |    |    |
| 1ST  | ○  |    |    |    |    | △  |    | ○  |    | ○  |
| 2ND  | ○  |    |    | △  | ○  |    |    | ○  | ○  |    |
| 3RD  | ○  |    |    | △  | ○  |    | ○  |    | ○  |    |
| 4TH  | ○  |    | ○  | △  | ○  |    |    |    | ○  |    |
| 5TH  | ○  | ○  | ○  |    |    |    |    |    |    |    |
| REV  |    | ○  |    |    |    | ○  |    | ○  |    |    |

CONTROL APPARATUS OF HYBRID VEHICLE

CROSS-REFERENCE TO RELATED APPLICATIONS

This application claims, under 35 USC 119, priority of Japanese Application No. 2000-402888 filed Dec. 28, 2000.

INCORPORATION BY REFERENCE

The disclosure of Japanese Patent Application No. 2000-402888 filed on Dec. 28, 2000, including the specification, drawings and abstract thereof, is incorporated herein by reference in its entirety.

BACKGROUND OF THE INVENTION

1. Field of the Invention

The invention relates to a control apparatus of a hybrid vehicle equipped with an internal combustion engine and a motor-generator and, more particularly, to a control apparatus of a hybrid vehicle for performing a torque reducing control at the time of a speed shift.

2. Description of the Related Art

With regard to automatic transmission-equipped vehicles, it is known that a torque reducing control is performed for the purpose of reducing the shift shock occurring during a speed shift.

In order to reduce the shift shock during a speed shift, it is effective to create a smooth semi-clutch state by reducing the working pressure on the clutch. However, reducing the working pressure of the clutch involves a drawback of a prolonged shift duration. Therefore, the engine torque is reduced at the time of a speed shift through an engine torque reducing control so as to lessen the shift shock without causing a prolonged shift duration.

In order to reduce the engine torque, it is a normal practice to employ a method in which the engine ignition timing is changed. That is, the engine torque is reduced through a generally-termed engine ignition timing-retarding control.

However, since the engine ignition timing-retarding control changes the fuel ignition timing from an optimal timing, the state of exhaust gas deteriorates during the timing-retarding control though the deterioration may last only for a short time.

This problem also occurs in hybrid vehicles equipped with an internal combustion engine and a motor-generator as drive power sources.

SUMMARY OF THE INVENTION

An object of the invention is to provide a control apparatus of a hybrid vehicle, which prevent deterioration of auto emission occurred by the torque reduction control in a hybrid vehicle.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described hereinafter with reference to the accompanying drawings.

Embodiment 1

Figure 1:
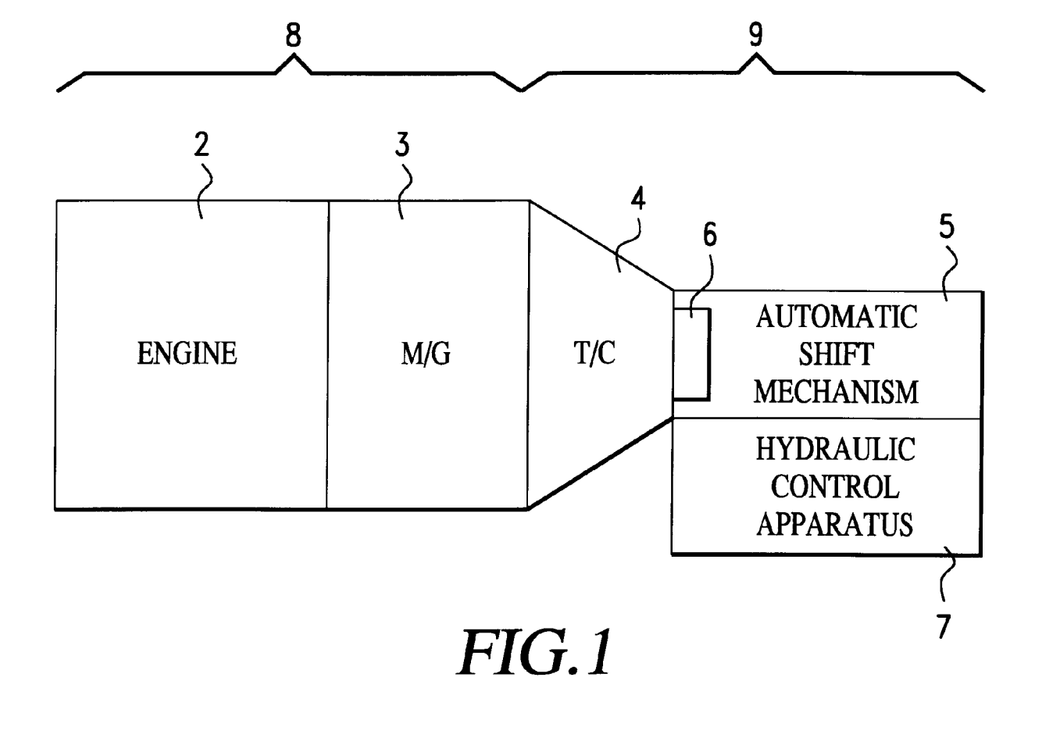
FIG. 1 is a schematic diagram illustrating a construction of a drive system of a hybrid vehicle.

FIG. 1 is a schematic block diagram illustrating a drive system 1 of a hybrid vehicle to which a control apparatus of a hybrid vehicle (hereinafter, simply referred to as "control apparatus") in accordance with the invention is applied. In the description below, the term "motor" means the same as "motor-generator".

As shown in FIG. 1, the drive system 1 includes a drive power source 8 and an automatic transmission 9. The drive power source 8 includes two systems of an engine (internal combustion engine) 2 and a motor-generator (M/G) 3. Drive power is outputted from one or both of the engine 2 and the motor-generator 3, and is inputted to the transmission 9.

The transmission 9 includes a torque converter (T/C) 4, an automatic shift mechanism 5, an oil pump 6, and a hydraulic control apparatus 7. The torque converter 4 transfers drive power inputted from the drive power source 8 to the automatic shift mechanism 5 via a working fluid. The automatic shift mechanism 5 includes a plurality of planetary gears, and a plurality of friction engagement elements that are engaged with and disengaged from component elements of the planetary gears. By changing combinations of engagement and disengagement of the friction engagement elements, the automatic shift mechanism 5 selects a plurality of speed ratios. The automatic shift mechanism 5 will be described in detail later. The oil pump 6 is disposed so as to cooperate with the torque converter 4. The oil pump 6 is driven by the engine 2 and the motor-generator 3 to generate oil pressure. The hydraulic control apparatus 7 controls the oil pressure generated by the oil pump 6 so as to suitably change the combinations of engagement and disengagement of the friction engagement elements of the automatic shift mechanism 5.

In the drive system 1 constructed as described above, the drive power outputted from one or both of the engine 2 and the motor-generator 3 is inputted to the automatic shift mechanism 5 via the torque converter 4. The input drive power is changed in speed to an appropriate speed stage based on the condition of run of the vehicle, and is outputted to wheels (drive wheels).

Figure 2A:
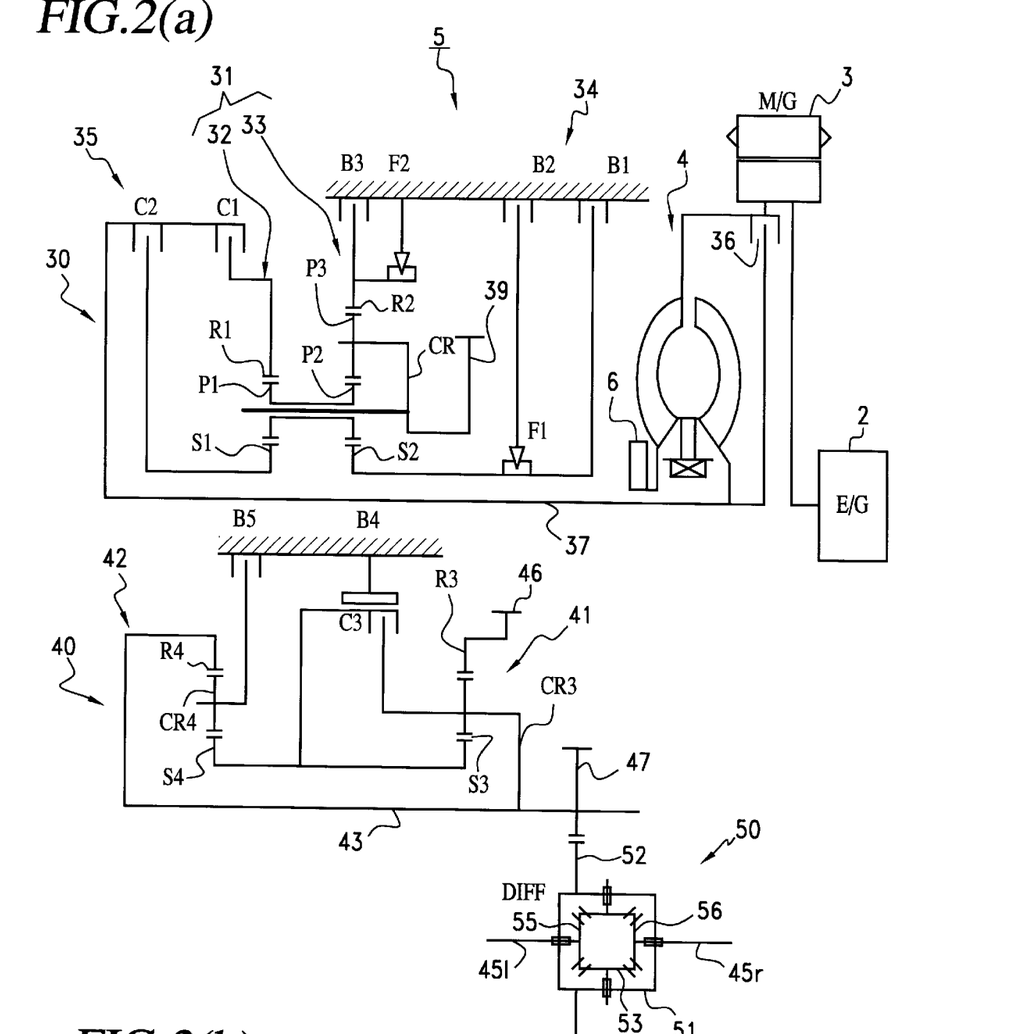
FIG. 2(a) is a skeleton diagram of an automatic shift mechanism.
Figure 2B:
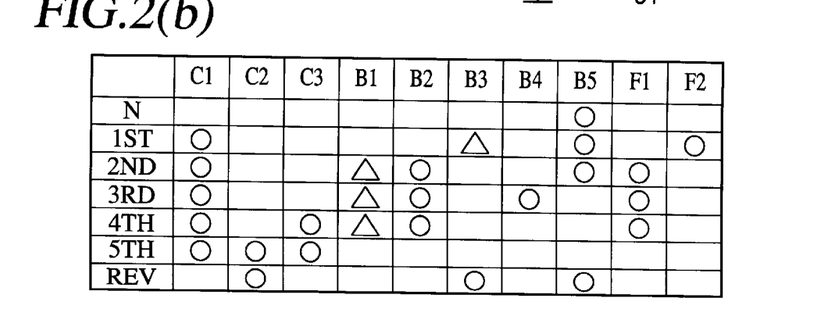
FIG. 2(b) is an operation table of the automatic shift mechanism.

The automatic shift mechanism 5 will next be described with reference to FIGS. 2(a) and 2(b). FIG. 2(a) is a skeleton diagram of the automatic shift mechanism 5. FIG. 2(b) is an operation table of the automatic shift mechanism 5.

As shown in FIG. 2(a), the automatic shift mechanism 5 has a main shift mechanism 30, a subsidiary shift mechanism 40, and a differential device 50. The main shift mechanism 30 is disposed on a first shaft aligned with an engine output shaft, and has an input shaft 37 to which drive power is transferred from the engine 2 and the motor-generator 3 via the torque converter 4 having a lockup clutch 36. Disposed sequentially on the first shaft are the oil pump 6 adjacent to the torque converter 4, a brake portion 34, a planetary gear unit portion 31, and a clutch portion 35 in that order.

The planetary gear unit portion 31 includes a simple planetary gear 32 and a double-pinion planetary gear 33. The simple planetary gear 32 has a sun gear S1, a ring gear R1, and a carrier CR supporting pinions P1 meshed with the sun gear S1 and the ring gear R1. The double-pinion planetary gear 33 has a sun gear S2, a ring gear R2, and a carrier CR that supports pinions P2 meshed with the sun gear S2 and pinions P3 meshed with the ring gear R2 so that the pinions P2 and the pinions P3 are meshed with each other. The sun gear S1 and the sun gear S2 are rotatably supported on hollow shafts that are rotatably supported on the input shaft 37. The carrier CR of the simple planetary gear 32 and the carrier CR of the double-pinion planetary gear 33 are one and the same carrier. Thus, the pinions P1 meshed with the sun gear S1 and the pinions P2 meshed with the sun gear S2 are interconnected so as to turn together as one unit.

The brake portion 34 includes a one-way clutch F1, a brake B1 and a brake B2 that are disposed sequentially in that order from a radially inner side to a radially outerside. Furthermore, a counter drive gear 39 is connected to the carrier CR via a spline. A one-way clutch F2 is disposed between the ring gear R2 and a case. A brake B3 is disposed between an outer periphery of the ring gear R2 and the case. The clutch portion 35 includes a forward clutch C1 and a direct clutch C2. The forward clutch C1 is disposed between an outer periphery of the ring gear R1 and the direct clutch C2. The direct clutch C2 is disposed between an inner periphery of a movable member (not shown) and a flange portion connected to a distal end of the hollow shaft.

The subsidiary shift mechanism 40 is disposed on a second shaft 43 that is disposed in parallel to the first shaft, which is formed by the input shaft 37. The first and second shafts, together with a third shaft formed by differential shafts (left and right-side axles) 45l, 45r, form a triangular arrangement in a side view. The subsidiary shift mechanism 40 has simple planetary gears 41, 42 in which a carrier CR3 and a ring gear R4 are firmly interconnected and sun gears S3, S4 are firmly interconnected so as to form a Simpson-type gear train. Furthermore, a ring gear R3 is connected to a counter driven gear 46 so as to form an input portion. The carrier CR3 and the ring gear R4 are connected to a speed-reducing gear 47 that forms an output portion. An UD direct clutch C3 is disposed between the ring gear R3 and the integrated sun gear S3, S4. The integrated sun gear S3 (S4) can be stopped by a brake B4. A carrier CR4 can be stopped by a brake B5. Therefore, the subsidiary shift mechanism 40 is able to provide three forward speed stages.

The differential device 50 forming the third shaft has a differential case 51 in which a gear 52 meshed with the speed-reducing gear 47 is fixed. The differential case 51 further contains differential gears 53 and left and right-side gears 55, 56 that are meshed with one another and are rotatably supported. The left and right-side axles 45l, 45r extend from the left and right-side gears 55, 56. Therefore, rotation from the gear 52 is distributed corresponding to load torques, and is transferred to the left and right front wheels via the left and right-side axles 45l, 45r.

Operation of the automatic shift mechanism 5 will be described with reference to the operation table shown in FIG. 2(b). During a first speed state, the forward clutch C1 and the one-way clutch F2 are engaged. As a result, the main shift mechanism 30, assuming a first speed state, transfers reduced-speed rotation to the ring gear R3 of the subsidiary shift mechanism 40 via the counter gears 39, 46. The subsidiary shift mechanism 40 is in a first speed state in which the carrier CR4 is stopped by the brake B5. Therefore, the reduced-speed rotation from the main shift mechanism 30 is further reduced in speed by the subsidiary shift mechanism 40, and is transferred to the left and right-side axles 45l, 45r via the gears 47, 52 and the differential device 50.

During a second speed state, the brake B2 as well as the forward clutch C1 is engaged, and the engagement of the one-way clutch F2 is smoothly switched to the engagement of the one-way clutch F1. Thus, the main shift mechanism 30 assumes a second speed state. The subsidiary shift mechanism 40 is in the first speed state based on the engagement of the brake B5. The combination of the second speed state and the first speed state provides a second speed as the entire automatic shift mechanism 5.

During a third speed state, the main shift mechanism 30 is in the same state as the above-described second speed state in which the forward clutch C1, the brake B2 and the one-way clutch F1 are engaged, and the brake B4 of the subsidiary shift mechanism 40 is engaged. Therefore, the sun gears S3, S4 are fixed, so that rotation from the ring gear R3 is outputted as a second-speed rotation from the carrier CR3. The combination of the second speed of the main shift mechanism 30 and the second speed of the subsidiary shift mechanism 40 provides a third speed as the entire automatic shift mechanism 5.

During a fourth speed state, the main shift mechanism 30 is in the same state as the second or third speed state in which the forward clutch C1, the brake B2 and the one-way clutch F1 are engaged. In the subsidiary shift mechanism 40, the brake B4 is released and the UD direct clutch C3 is engaged. As a result, the ring gear R3 and the sun gear S3 (S4) are connected, so that the planetary gears 41, 42 rotate together (locked-up state). Thus, the combination of the second speed of the main shift mechanism 30 and the locked-up state (third speed) of the subsidiary shift mechanism 40 provides a fourth-speed rotation as the entire automatic shift mechanism 5.

During a fifth speed state, the forward clutch C1 and the direct clutch C2 are engaged, so that rotation of the input shaft 37 is transferred to the ring gear R1 and the sun gear S1. Thus, the main shift mechanism 30 assumes a locked-up state in which the planetary gears 32, 33 of the gear unit portion 31 turn together. The subsidiary shift mechanism 40 is in the locked-up state in which the UD direct clutch C3 is engaged. Thus, the combination of the third speed (locked-up state) of the main shift mechanism 30 and the third speed (locked-upstate) of the subsidiary shift mechanism 40 provides a fifth-speed rotation as the entire automatic shift mechanism 5.

During a reverse drive state, the direct clutch C2 and the brake B3 are engaged and the brake B5 is also engaged. As a result, reverse rotation is extracted from the main shift mechanism 30. The subsidiary shift mechanism 40 is maintained in the first speed state in which the carrier CR4 is stopped in the reverse rotation direction as well due to the brake B5. Thus, the combination of the reverse rotation of the main shift mechanism 30 and the first-speed rotation of the subsidiary shift mechanism 40 provides a speed-reduced reverse rotation.

In FIG. 2(b), the triangular symbol indicates engagement at the time of engine brake effect. That is, during the first speed, the brake B3 is engaged to fix the ring gear R2 as a substitute for the one-way clutch F2. During the second, third and fourth speeds, the brake B1 is engaged to fix the sun gear S2 as a substitute for the one-way clutch F1.

During an upshift, input-related members of the drive system 1 constructed as described above come to have relatively low-speed rotations, so that an inertia torque appears on the output shaft side. Therefore, a shift shock occurs at the time of an upshift. During a downshift, the inertia torque used to increase the rotation speed of the input-related members becomes unnecessary at the time of rotation synchronization during a late period of the shift, so that the inertia torque appears on the output side. Thus, a shift shock also occurs at the time of a downshift. Hence, it is preferable to perform a torque reducing control in order to reduce the shift shock.

Even in a continuously variable transmission, inertia torque appears during an upshift. Therefore, when a speed shift is performed stepwise by manually operating the continuously variable transmission, it is preferable to perform the torque reducing control in order to reduce the torque shock.

The torque reducing control in this embodiment will be described below.

The drive power source 8 in this embodiment includes the engine 2 and the motor-generator 3 that are directly interconnected in a driving manner as shown in FIG. 1. Therefore, the motor-generator 3 can be driven by the engine 2, and the engine 2 can be driven by the motor-generator 3. Furthermore, drive power can be generated by one of the engine 2 and the motor-generator 3 or by the cooperation thereof, and the thus-generated drive power can be transferred to the torque converter 4. This means that when there is an input from the side of the torque converter 4 to the side of the drive power source 8, one of the engine 2 and the motor-generator 3 or both of them can serve as a resistance.

Figure 3:
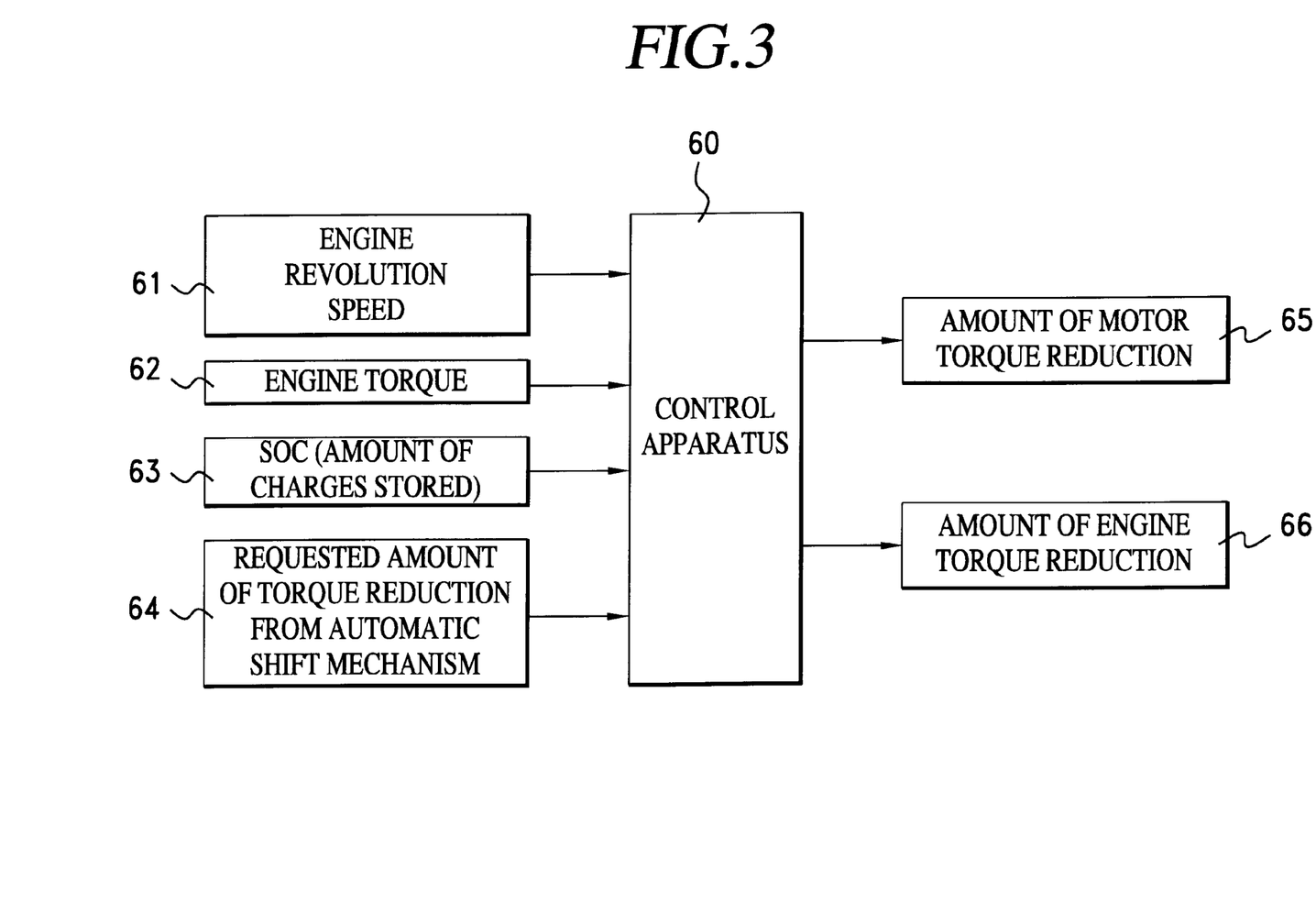
FIG. 3 is a block diagram illustrating input and output signals with respect to a control apparatus.

FIG. 3 is a block diagram indicating input and output signals with respect to a control apparatus (torque reducing control apparatus) 60 in accordance with the embodiment.

As indicated in FIG. 3, the input signals to the control apparatus 60 include signals of an engine revolution speed 61, an engine torque 62, an amount of charges stored in a storage battery (SOC) 63, and a requested amount of torque reduction 64 from the automatic shift mechanism 5. The output signals from the control apparatus 60 include an amount of motor torque reduction 65 for the motor-generator 3, and an amount of engine torque reduction 66 for the engine 2.

The aforementioned input and output signals indicate values obtained directly from various sensors or values obtained through calculation of sensor-provided values. That is, the engine revolution speed 61 is detected by a revolution speed sensor, and the engine torque 62 is calculated from the degree of opening of the throttle valve, the amount of fuel injected, etc. The amount of charges stored (SOC) is calculated from the motor current flowing at the time of charging during which the motor-generator 3 functions as a generator, the charging efficiency, etc. The amount of charges stored 63 is detected by an amount-of-charges-stored detecting means (not shown). The requested amount of torque reduction 64 is determined from the engine revolution speed, the torque of the output shaft of the automatic transmission 9, etc. The amount of motor torque reduction 65 is set based on the amount of charges stored 63 in the battery, etc. The amount of engine torque reduction 66 is set at an amount obtained by subtracting the amount of motor torque reduction 65 from the requested amount of torque reduction 64.

In this embodiment, the amount of engine torque reduction is controlled by an engine ignition timing retarding control or a control of reducing the degree of throttle opening by using an electromagnetic throttle. The amount of motor torque reduction is controlled by reducing the forward torque of the motor-generator 3, or applying a reverse torque, or applying a regenerative braking torque, or the like.

A method for setting the amount of motor torque reduction will next be described with reference to a motor characteristic map of FIG. 4.

Figure 4:
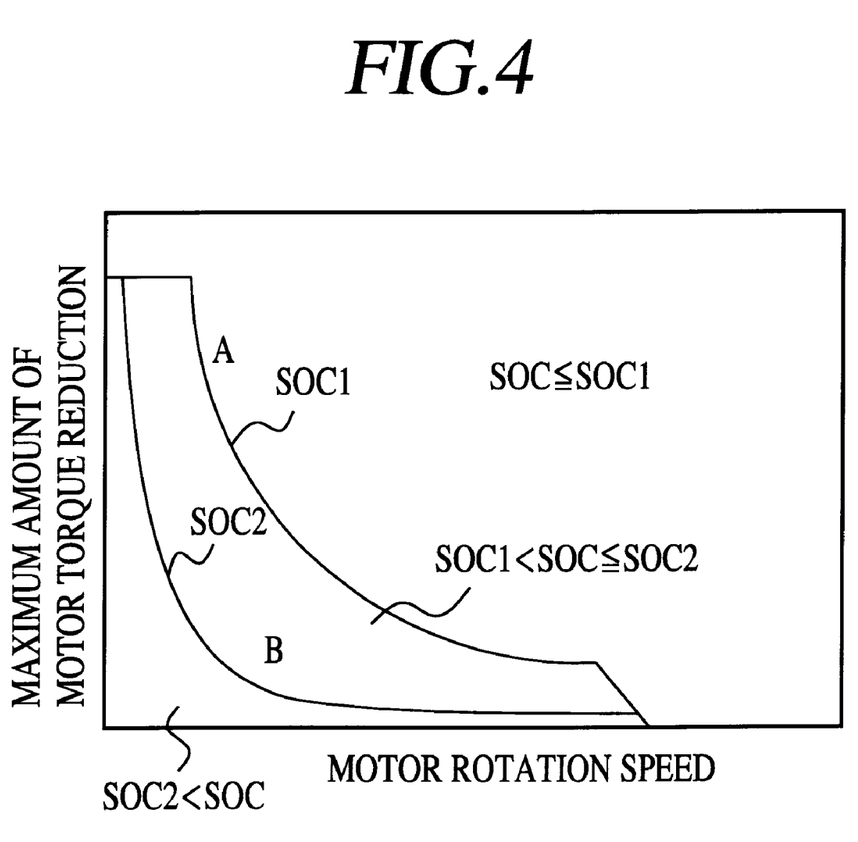
FIG. 4 is a diagram indicating a relationship between the motor rotation speed and the amount of motor torque reduction, with the amount of charges stored (SOC) being a parameter.

In the motor characteristic map of FIG. 4, the motor rotation speed (equal to the engine revolution speed) is indicated by the abscissa axis, and the maximum amount of motor torque reduction is indicated by the ordinate axis.

In this embodiment, the maximum amount of motor torque reduction is set based on the amount of charges stored (SOC) and the motor rotation speed.

First, a first threshold value (SOC1) and a second threshold value (SOC2) are determined as threshold values of the amount of charges of the storage battery. As a basic fashion of determining these threshold values in this invention, the amount of torque reduction by the motor-generator 3, that is, the amount of motor torque reduction, is increased as much as possible while the overcharge of the storage battery is prevented. As examples of the thresholds, SOC1 is set at 80% in charging rate, and SOC2 is set at 90% in charging rate. The relationship between the motor rotation speed and the maximum amount of motor torque reduction is set as indicated by a line A based on SOC1, and is set as indicated by a line B based on SOC2. The lines A, B are preset through experiments or the like.

On the basis of the setting described above, the maximum amount of motor torque reduction with respect to the actual motor rotation speed is determined in accordance with the amount of charges (SOC) detected by the amount-of-charges-stored detecting means, as described below.

(1) If SOC≦SOC1 (e.g., if the charging rate is less than or equal to 80%), the maximum amount of motor torque reduction with respect to the motor rotation speed is set based on the line A.

(2) If SOC1<SOC≦SOC2 (e.g., if the charging rate is greater than 80%, and is less than or equal to 90%), the maximum amount of motor torque reduction 65 with respect to the motor rotation speed is set by linear interpolation between the line A and the line B. For example, if the charging rate is 85%, the maximum amount of motor torque reduction is set at an intermediate point between the line A and the line B.

(3) If SOC2<SOC (e.g., if the charging rate is greater than 90%), the amount of motor torque reduction is set to zero. That is, in this case, the torque reduction by the motor-generator 3 is not performed.

Figure 5:
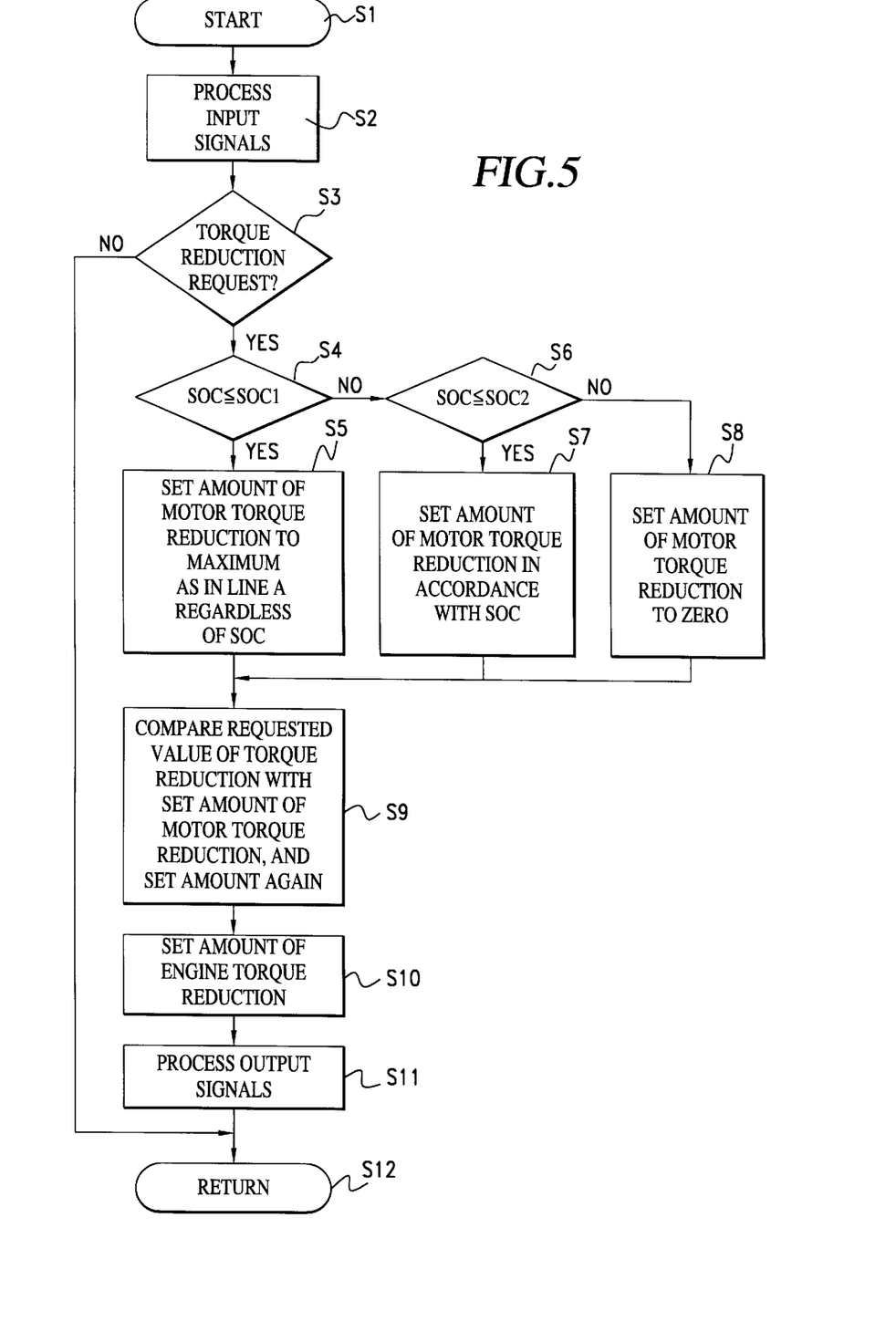
FIG. 5 is a flowchart illustrating a method of setting the amount of torque reduction.

Next, the flow of setting the amount of torque reduction will next be described with reference to the flowchart of FIG. 5. In FIG. 5, "S1", "S2", . . . represent the numbers of steps.

After the procedure starts (S1), the control apparatus 60 processes input signals, such as the engine revolution speed 61, the engine torque 62, etc. (S2). After that, if there is a torque reduction request from the automatic shift mechanism 5 ("YES" at S3), the SOC is checked (S4). If SOC≦SOC1 ("YES" at S4), the amount of motor torque reduction is set to a maximum value as indicated by the line A regardless of the value of SOC. Conversely, if it is determined in step S4 that SOC≦SOC1 ("NO" at S4), it is determined in step S6 whether SOC≦SOC2. If the determination in step S6 is "YES", the amount of motor torque reduction is set (S7). Conversely, if the determination in step S6 is "NO", the amount of motor torque reduction is set to "0" (S8).

By the step S5, S7 or S8, the amount of motor torque reduction with respect to a given amount of SOC is set. Then, the requested amount of torque reduction and the set amount of motor torque reduction are compared, and an amount of motor torque reduction is set again (S9). If the requested amount of torque reduction is smaller than the set amount of motor torque reduction, the requested amount of torque reduction is set as an amount of motor torque reduction. In this case, the amount of engine torque reduction in step S10 is zero. After the amount of motor torque reduction is set, the amount obtained by subtracting the amount of motor torque reduction from the requested amount of torque reduction is set as an amount of motor torque reduction (S10). Then, the amount of motor torque reduction and the amount of engine torque reduction set as described above are subjected to signal processing, and then are outputted to the motor-generator 3 and the engine 2, respectively (S11). After that, the process returns from step S12 to step S1. If it is determined in step S3 that the torque reduction request is not present ("NO" at S3), the process immediately proceeds to step S12 and then to step S1.

As described above, according to the embodiment, if the torque reduction request is outputted, the amount of motor torque reduction 65 of the requested torque reduction is set to a greatest-possible amount within such a range that the amount of charge in the storage battery does not enter an overcharge state, and the remainder amount is set as an amount of engine torque reduction. Therefore, it is possible to mitigate the degradation of exhaust gas caused by the engine timing retarding control.

Although the embodiment has been described in conjunction with the case where the first threshold value is 80% in charging rate and the second threshold value is 90% in charging rate, these values are not limited to these values, but may be suitably set in accordance with the capacity of the storage battery, the charging efficiency, etc. Furthermore, although the two thresholds of SOC, that is, the first threshold value (SOC1) and the second threshold value (SOC2), are set in the foregoing embodiment, it is also possible to set only one threshold value. In that case, the motor characteristic map is provided by, for example, only the line A or the line B in FIG. 4. If the SOC is less than or equal to the threshold value, the amount of motor torque reduction is set to "0".

The above-described torque reducing control is performed both for upshift and for downshift in a real case.

The invention is applicable not only to a construction in which the engine 2 and the motor-generator 3 have a connection relationship as illustrated in FIG. 2(a), but also to other types of hybrid vehicles having an engine and a motor-generator. For example, the invention is applicable to a type in which the engine and the motor-generator are switched by a clutch, a type in which one of the engine and the motor-generator is used in an auxiliary fashion, a type in which a power combining mechanism is provided for combining the output of the engine and the output of the motor-generator and distributing power thereto, etc.

While the invention has been described with reference to what is presently considered to be preferred embodiments thereof, it is to be understood that the invention is not limited to the disclosed embodiments or constructions. To the contrary, the invention is intended to cover various modifications and equivalent arrangements.

FIG. 1
2: ENGINE
5: AUTOMATIC SHIFT MECHANISM
7: HYDRAULIC CONTROL APPARATUS
FIG. 3
60: CONTROL APPARATUS
61: ENGINE REVOLUTION SPEED
62: ENGINE TORQUE
63: SOC (AMOUNT OF CHARGES STORED)
64: REQUESTED AMOUNT OF TORQUE REDUCTION FROM AUTOMATIC SHIFT MECHANISM
65: AMOUNT OF MOTOR TORQUE REDUCTION
66: AMOUNT OF ENGINE TORQUE REDUCTION
FIG. 4
MAXIMUM AMOUNT OF MOTOR TORQUE REDUCTION MOTOR ROTATION SPEED
FIG. 5
S2: PROCESS INPUT SIGNALS
S3: TORQUE REDUCTION REQUEST ?
S5: SET AMOUNT OF MOTOR TORQUE REDUCTION TO MAXIMUM AS IN LINE A REGARDLESS OF SOC
S7: SET AMOUNT OF MOTOR TORQUE REDUCTION IN ACCORDANCE WITH SOC
S8: SET AMOUNT OF MOTOR TORQUE REDUCTION TO ZERO
S9: COMPARE REQUESTED VALUE OF TORQUE REDUCTION WITH SET AMOUNT OF MOTOR TORQUE REDUCTION, AND SET AMOUNT AGAIN
S10: SET AMOUNT OF ENGINE TORQUE REDUCTION
S11: PROCESS OUTPUT SIGNALS

What is claimed is:

1. A control apparatus for a hybrid vehicle in which an internal combustion engine and a motor-generator are provided as drive power sources and drive power from at least one of the drive power sources is input to a transmission, and wherein the drive power is output by the transmission to a drive wheel via an output shaft, the control apparatus comprising:
    torque reduction control means for controlling reduction of an output torque from the at least one drive power source so as to reduce torque of the output shaft during a speed shift, the torque reduction control means including:
        first reducing means for controlling the internal combustion engine;
        second reducing means for controlling the motor-generator, said second reducing means, responsive to a torque reduction request, setting a first portion of a requested amount of torque reduction as motor torque reduction and setting a remainder second portion of the requested amount of torque reduction as engine torque reduction by the first reducing means, with priority given to motor torque reduction; and
        amount-of-charge-stored detecting means for detecting an amount of charge stored in an electricity storage device connected to the motor-generator,
        wherein if the amount of stored charge detected by the amount-of-charge-stored detecting means is less than or equal to a first threshold value, the torque reduction control means sets the amount of motor torque reduction at a value that is less than or equal to a maximum value pre-set corresponding to a motor rotation speed.

2. A control apparatus of a hybrid vehicle according to claim 1, wherein if the amount of stored charge detected by the amount-of-charge-stored detecting means is greater than the first threshold value, and is less than or equal to a second threshold value that is greater than the first threshold value, the torque reduction control means sets the amount of motor torque reduction at a value that is less than or equal to a maximum value determined based on a pre-set motor characteristic map that indicates a relationship between the motor rotation speed and the amount of motor torque reduction.

3. A control apparatus of a hybrid vehicle according to claim 2, wherein if the amount of stored charge detected by the amount-of-charge-stored detecting means is greater than the second threshold value, the torque reduction control means sets the amount of motor torque reduction at zero.

4. A control apparatus for a hybrid vehicle in which an internal combustion engine and a motor-generator are provided as drive power sources and drive power from at least one of the drive power sources is input to a transmission, and wherein the drive power is output by the transmission to a drive wheel via an output shaft, the control apparatus comprising:

torque reduction control means for controlling reduction of an output torque from the at least one drive power source so as to reduce torque of the output shaft during a speed shift, the torque reduction control means including:

first reducing means for controlling the internal combustion engine;

second reducing means for controlling the motor-generator, said second reducing means, responsive to a torque reduction request, setting a first portion of a requested amount of torque reduction as motor torque reduction and setting a remainder second portion of the requested amount of torque reduction as engine torque reduction by the first reducing means, with priority given to motor torque reduction; and wherein the torque reduction control means sets the amount of motor torque reduction so as to be less than or equal to a maximum amount of motor torque reduction set in accordance with a motor rotation speed.

5. A control apparatus of a hybrid vehicle according to claim 4, further comprising amount-of-charge-stored detecting means for detecting an amount of stored charge in an electricity storage device connected to the motor-generator, wherein the maximum amount of motor torque reduction is changed in accordance with the amount of stored charge detected by the amount-of-charge-stored detecting means.

6. A control apparatus for a hybrid vehicle in which an internal combustion engine and a motor-generator are provided as drive power sources and drive power from at least one of the drive power sources is input to a transmission, and wherein the drive power is output by the transmission to a drive wheel via an output shaft, the control apparatus comprising:

torque reduction control means for controlling reduction of an output torque from the at least one drive power source so as to reduce torque of the output shaft during a speed shift, the torque reduction control means including:

first reducing means for controlling the internal combustion engine;

second reducing means for controlling the motor-generator, said second reducing means, responsive to a torque reduction request, setting a first portion of a requested amount of torque reduction as motor torque reduction and setting a remainder second portion of the requested amount of torque reduction as engine torque reduction by the first reducing means, with priority given to motor torque reduction; and wherein if the requested amount of torque reduction is less than or equal to a maximum amount of motor torque reduction set in accordance with a motor rotation speed, the torque reduction control means sets the amount of motor torque reduction to the requested amount of torque reduction, and wherein if the requested amount of torque reduction is greater than the maximum amount of motor torque reduction, the torque reduction control means sets the amount of motor torque reduction at the maximum amount of motor torque reduction, and sets a remainder amount obtained by subtracting the maximum amount of motor torque reduction from the requested amount of torque reduction as the amount of engine torque reduction.

7. A control apparatus of a hybrid vehicle according to claim 6, further comprising amount-of-charge-stored detecting means for detecting an amount of stored charge in an electricity storage device connected to the motor-generator, wherein the maximum amount of motor torque reduction is changed in accordance with the amount of stored charge detected by the amount-of-charge-stored detecting means.

\* \* \* \* \*